US012180649B2

(12) United States Patent
Kato et al.

(10) Patent No.: US 12,180,649 B2
(45) Date of Patent: Dec. 31, 2024

(54) FABRIC TREATMENT AGENT, TEXTILE PRINTING INK SET, TEXTILE PRINTING METHOD, AND TEXTILE PRINTED FABRIC

(71) Applicant: Konica Minolta, Inc., Tokyo (JP)

(72) Inventors: Mai Kato, Koganei (JP); Ken Nito, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 374 days.

(21) Appl. No.: 17/852,849

(22) Filed: Jun. 29, 2022

(65) Prior Publication Data
US 2023/0045096 A1 Feb. 9, 2023

(30) Foreign Application Priority Data

| Jul. 12, 2021 | (JP) | 2021-114713 |
| Dec. 14, 2021 | (JP) | 2021-202110 |
| Dec. 14, 2021 | (JP) | 2021-202111 |
| Apr. 12, 2022 | (JP) | 2022-065619 |

(51) Int. Cl.
| B41J 3/407 | (2006.01) |
| C09D 11/54 | (2014.01) |
| D06P 1/16 | (2006.01) |
| D06P 1/20 | (2006.01) |
| D06P 1/642 | (2006.01) |
| D06P 1/92 | (2006.01) |
| D06P 3/14 | (2006.01) |
| D06P 3/60 | (2006.01) |
| D06P 5/00 | (2006.01) |
| D06P 5/28 | (2006.01) |
| D06P 5/30 | (2006.01) |

(52) U.S. Cl.
CPC ........... *D06P 1/6426* (2013.01); *B41J 3/4078* (2013.01); *C09D 11/54* (2013.01); *D06P 1/16* (2013.01); *D06P 1/20* (2013.01); *D06P 1/6429* (2013.01); *D06P 1/92* (2013.01); *D06P 3/143* (2013.01); *D06P 3/60* (2013.01); *D06P 3/6033* (2013.01); *D06P 5/002* (2013.01); *D06P 5/004* (2013.01); *D06P 5/30* (2013.01); *D06P 3/6041* (2013.01); *D06P 5/006* (2013.01)

(58) Field of Classification Search
CPC .. D06P 1/6426; D06P 1/16; D06P 1/20; D06P 1/6429; D06P 1/92; D06P 3/143; D06P 3/60; D06P 3/6033; D06P 5/002; D06P 5/004; D06P 5/30; D06P 3/6041; D06P 5/006; B41J 3/4078; C09D 11/54
See application file for complete search history.

(56) References Cited

U.S. PATENT DOCUMENTS

2011/0025753 A1* 2/2011 Yanagi ................... C09D 11/54
524/211

FOREIGN PATENT DOCUMENTS

| CN | 102675969 A | * | 9/2012 | ............. C09D 11/10 |
| JP | S55-163288 A | | 12/1980 | |
| JP | H07-216763 A | | 8/1995 | |
| JP | 2021042514 A | * | 3/2021 | ................ D06P 1/16 |

* cited by examiner

*Primary Examiner* — Yaovi M Ameh
(74) *Attorney, Agent, or Firm* — LUCAS & MERCANTI, LLP

(57) ABSTRACT

A fabric treatment agent that is used in textile printing with a sublimable color material includes a color-material scavenging compound having an Rf value of 0.7 or less according to paper chromatography performed under following conditions. In Procedure 1, cellulose filter paper is impregnated with a 10% solution of the color-material scavenging compound and then dried to prepare a carrier. In Procedure 2, a 0.1% solution of a sublimable color material in tetrahydrofuran is spotted on the carrier and then dried to prepare a development sample. In Procedure 3, the development sample is developed using acetonitrile as a solvent for 3 minutes at 25° C. In Procedure 4, the Rf value is calculated by a following formula:

$$Rf = \frac{\text{(distance travelled by the sublimable color material)}}{\text{(distance travelled by acetonitrile)}}.$$

17 Claims, No Drawings

FABRIC TREATMENT AGENT, TEXTILE PRINTING INK SET, TEXTILE PRINTING METHOD, AND TEXTILE PRINTED FABRIC

CROSS-REFERENCE TO RELATED APPLICATIONS

The entire disclosures of Japanese Patent Applications No. 2021-114713 filed on Jul. 12, 2021, No. 2021-202111 filed on Dec. 14, 2021, No. 2021-202110 filed on Dec. 14, 2021, and No. 2022-065619 filed on Apr. 12, 2022 are incorporated herein by reference in its entirety.

TECHNOLOGICAL FIELD

The present invention relates to a fabric treatment agent, a textile printing ink set, a textile printing method, and a textile-printed fabric.

More specifically, the present invention relates to a fabric treatment agent and the like that are capable of reducing discoloration and fading of a textile-printed fabric.

DESCRIPTION OF RELATED ART

Conventionally, a textile printing method is known in which textile printing inks including sublimable color materials are used to dye a fabric. Since a sublimable color material, which is usually hydrophobic, can be easily fixed to a polyester fabric, which is also hydrophobic, appropriate textile printing can be easily performed by such a textile printing method. On the other hand, a sublimable color material has difficulty in fixing to a fabric including hydrophilic fibers such as natural fibers and synthetic cellulose fibers, due to the polarity difference between the sublimable color material and the fabric.

In order to solve such problems, Japanese Patent Application Laid-Open No. H7-216763 discloses a technology for sublimation transfer textile printing in which a sublimable color material is fixed to a fabric that is swelled with a swelling agent (polyhydric alcohols) before sublimation transfer, and further, the sublimable color material is sealed and adhered inside the fabric by a post-treatment of applying a synthetic resin solution to the fabric after the sublimation transfer.

Japanese Patent Application Laid-Open No. S55-163288 discloses a technology for preventing deterioration of cellulose fibers by treating cellulose fiber structures with an acid chloride and an N-heterocyclic compound, followed by chemical modification by heat treatment or dry-heat treatment, and then textile printing with a dye.

As a technology that provides a simple method that does not require a post-process, Japanese Patent Application Laid-Open No. 2021-42514 discloses a technology in which, in addition to a swelling agent (a polyhydric alcohol), a water repellent agent (for example, poly(meth)acrylate including a polyfluoroalkyl group) is further added to the fabric before the sublimation transfer.

However, even with these technologies, there remained problems of discoloration and fading of a textile-printed fabric over time due to insufficient fixation of the sublimable color material or bleed-out of the dye, especially in a high-temperature environment.

SUMMARY

The present invention has been made in view of the above problems and circumstances, and a problem to be solved by an aspect of the present invention is to provide a fabric treatment agent, a textile printing ink set, and a textile printing method that that is capable of reducing discoloration and fading of a textile-printed fabric, and a textile-printed fabric in which discoloration and fading are reduced. Also, a problem to be solved by another aspect of the present invention is to provide a fabric treatment agent that can achieve both a high colorability and a texture, and can reduce bleed-out of a dye.

In order to solve the above problems, the inventors examined the causes etc. of the problem to be solved by the above one aspect, and found that it is possible to reduce discoloration and fading of a textile-printed fabric by using a color-material scavenging compound having a retention factor (RD value (an index of scavenging color material, and the smaller Rf value indicates larger scavenging power of the color material) of 0.7 or less, and thus arrived at the present invention.

Also, the inventors examined the causes etc. of the problem to be solved by the above another aspect, and found that it is possible to provide a fabric treatment agent that can achieve both the high colorability and the texture, and can reduce bleed-out of a dye when a fabric treatment agent includes a solvent that swells fabric fibers (having an I/O value of 1.5 or more) and an aromatic heterocyclic compound that scavenges a dye inside the fibers, and thus arrived at the present invention.

To achieve at least one of the above-mentioned objects, according to an aspect of the present invention, there is provided the following fabric treatment agent.
1. A fabric treatment agent that is used in textile printing with a sublimable color material, including:
a color-material scavenging compound having an Rf value of 0.7 or less according to paper chromatography performed under following conditions:
Procedure 1: Cellulose filter paper is impregnated with a 10% solution of the color-material scavenging compound and then dried to prepare a carrier; Procedure 2: A 0.1% solution of a sublimable color material in tetrahydrofuran is spotted on the carrier and then dried to prepare a development sample;
Procedure 3: The development sample is developed using acetonitrile as a solvent for 3 minutes at 25° C.; and
Procedure 4: The Rf value is calculated by a following formula:

$$Rf = \frac{\text{(distance travelled by the sublimable color material)}}{\text{(distance travelled by acetonitrile)}}.$$

2. A fabric treatment agent that is used in textile printing with a sublimable color material, including:
a color-material scavenging compound having an Rf value of 0.7 or less according to paper chromatography performed under following conditions:
Procedure 1: Cellulose filter paper is impregnated with a 10% solution of the color-material scavenging compound and then dried to prepare a carrier;
Procedure 2: A 0.1% solution of C.I. Disperse Red 60 in tetrahydrofuran is spotted on the carrier and then dried to prepare a development sample;
Procedure 3: The development sample is developed using acetonitrile as a solvent for 3 minutes at 25° C.; and
Procedure 4: The Rf value is calculated by a following formula:

$$Rf = \frac{\text{(distance travelled by the } C.I. \text{ Disperse Red 60)}}{\text{(distance travelled by acetonitrile)}}.$$

3. The fabric treatment agent according to item 1 or 2, wherein the color-material scavenging compound has the Rf value of 0.5 or less.

4. The fabric treatment agent according to any one of items 1 to 3, further including a solvent having an I/O value of 1.5 or more, the I/O value being a ratio of an inorganic value of the solvent to an organic value of the solvent.

5. The fabric treatment agent according to any one of items 1 to 4, wherein the color-material scavenging compound has an aromatic ring.

Preferably, the color-material scavenging compound has three or more aromatic rings.

6. The fabric treatment agent according to any one of items 1 to 5, wherein the color-material scavenging compound has five or more aromatic rings.

7. The fabric treatment agent according to any one of items 1 to 6, wherein the color-material scavenging compound has a structure having two aromatic rings that are bonded to each other by a single bond.

According to another aspect of the present invention, there is provided the following textile printing ink set.

8. A textile printing ink set including:
the fabric treatment agent according to any one of items 1 to 7; and
a textile printing ink that includes the sublimable color material.

Preferably, a pretreated fabric related to the present invention includes a color-material scavenging compound that has an Rf value of 0.7 or less according to paper chromatography performed under following conditions:

Procedure 1: Cellulose filter paper is impregnated with a 10% solution of the color-material scavenging compound and then dried to prepare a carrier;

Procedure 2: A 0.1% solution of a sublimable color material in tetrahydrofuran is spotted on the carrier and then dried to prepare a development sample;

Procedure 3: The development sample is developed using acetonitrile as a solvent for 3 minutes at 25° C.; and Procedure 4: The Rf value is calculated by a following formula:

$$Rf = \frac{\text{(distance travelled by the sublimable color material)}}{\text{(distance travelled by acetonitrile)}}.$$

Preferably, a pretreated fabric related to the present invention includes a color-material scavenging compound that has an Rf value of 0.7 or less according to paper chromatography performed under following conditions:

Procedure 1: Cellulose filter paper is impregnated with a 10% solution of the color-material scavenging compound and then dried to prepare a carrier;

Procedure 2: A 0.1% solution of C.I. Disperse Red 60 in tetrahydrofuran is spotted on the carrier and then dried to prepare a development sample;

Procedure 3: The development sample is developed using acetonitrile as a solvent for 3 minutes at 25° C.; and Procedure 4: The Rf value is calculated by a following formula:

$$Rf = \frac{\text{(distance travelled by the } C.I. \text{ Disperse Red 60)}}{\text{(distance travelled by acetonitrile)}}.$$

According to another aspect of the present invention, there is provided the following textile printing method.

9. A textile printing method including:
dyeing of a fabric with a sublimable color material in a presence of a color-material scavenging compound, the color-material scavenging compound having an Rf value of 0.7 or less according to paper chromatography performed under following conditions:

Procedure 1: Cellulose filter paper is impregnated with a 10% solution of the color-material scavenging compound and then dried to prepare a carrier;

Procedure 2: A 0.1% solution of a sublimable color material in tetrahydrofuran is spotted on the carrier and then dried to prepare a development sample;

Procedure 3: The development sample is developed using acetonitrile as a solvent for 3 minutes at 25° C.; and Procedure 4: The Rf value is calculated by a following formula:

$$Rf = \frac{\text{(distance travelled by the sublimable color material)}}{\text{(distance travelled by acetonitrile)}}.$$

Preferably, a textile printing method related to the present invention includes:

dyeing of a fabric with a sublimable color material in a presence of a color-material scavenging compound, the color-material scavenging compound having an Rf value of 0.7 or less according to paper chromatography performed under following conditions:

Procedure 1: Cellulose filter paper is impregnated with a 10% solution of the color-material scavenging compound and then dried to prepare a carrier;

Procedure 2: A 0.1% solution of C.I. Disperse Red 60 in tetrahydrofuran is spotted on the carrier and then dried to prepare a development sample;

Procedure 3: The development sample is developed using acetonitrile as a solvent for 3 minutes at 25° C.; and Procedure 4: The Rf value is calculated by a following formula:

$$Rf = \frac{\text{(distance travelled by the } C.I. \text{ Disperse Red 60)}}{\text{(distance travelled by acetonitrile)}}.$$

10. The textile printing method according to item 9, wherein the fabric includes natural fibers or synthetic cellulose fibers.

11. The textile printing method according to item 9 or 10, wherein the dyeing is done by a sublimation transfer method.

According to another aspect of the present invention, there is provided the following textile printing fabric.

12. A textile-printed fabric including:
a color-material scavenging compound; and
a sublimable color material, wherein
the color-material scavenging compound has an Rf value of 0.7 or less according to paper chromatography performed under following conditions:

Procedure 1: Cellulose filter paper is impregnated with a 10% solution of the color-material scavenging compound and then dried to prepare a carrier;

Procedure 2: A 0.1% solution of a sublimable color material in tetrahydrofuran is spotted on the carrier and then dried to prepare a development sample;

Procedure 3: The development sample is developed using acetonitrile as a solvent for 3 minutes at 25° C.; and Procedure 4: The Rf value is calculated by a following formula:

$$Rf = \frac{\text{(distance travelled by the sublimable color material)}}{\text{(distance travelled by acetonitrile)}}.$$

Preferably, a textile printing fabric according to the present invention includes:
a color-material scavenging compound; and
a sublimable color material, wherein
the color-material scavenging compound has an Rf value of 0.7 or less according to paper chromatography performed under following conditions:
Procedure 1: Cellulose filter paper is impregnated with a 10% solution of the color-material scavenging compound and then dried to prepare a carrier;
Procedure 2: A 0.1% solution of C.I. Disperse Red 60 in tetrahydrofuran is spotted on the carrier and then dried to prepare a development sample;
Procedure 3: The development sample is developed using acetonitrile as a solvent for 3 minutes at 25° C.; and
Procedure 4: The Rf value is calculated by a following formula:

$$Rf = \frac{\text{(distance travelled by the C.I. Disperse Red 60)}}{\text{(distance travelled by acetonitrile)}}.$$

According to another aspect of the present invention, there is provided the following fabric treatment agent.
13. A fabric treatment agent that is used in textile printing by a sublimation transfer method, including:
a solvent that has an I/O value of 1.5 or more, the I/O value being a ratio of an inorganic value of the solvent to an organic value of the solvent; and
an aromatic heterocyclic compound.
14. The fabric treatment agent according to item 13, wherein the solvent is included in a range of 5 to 95% by mass with respect to total of the fabric treatment agent.
Preferably, the aromatic heterocyclic compound is included in the range of 1 to 30% by mass of the total of the fabric treatment agent.
Preferably, the solvent has an I/O value in the range of 1.5 to 5.0.
15. The fabric treatment agent according to item 13 or 14, wherein the solvent has a boiling point in a range of 150 to 250° C.
16. The fabric treatment agent according to any one of items 13 to 15, wherein the solvent includes at least one of dimethyl sulfoxide, ethylene glycol, and propylene glycol.
Preferably, the aromatic heterocyclic compound is a nitrogen-including heterocyclic compound.
Preferably, the nitrogen-including heterocyclic compound is a compound having at least one selected from a pyrazole ring, a triazole ring, and an imidazole ring.
Preferably, the aromatic heterocyclic compound have a low molecular weight.
Preferably, a textile printing method related to another aspect of the present invention is done by a sublimation transfer method using a dye and includes:
application of the fabric treatment agent to a fabric; and
sublimation transfer of the dye.
Preferably, the fabric includes cellulose fibers.
Preferably, the transfer temperature is higher than the boiling point of the solvent.

Preferably, a textile-printed fabric related to another aspect of the present invention includes a dye and an aromatic heterocyclic compound that is derived from the fabric treatment agent.

DETAILED DESCRIPTION OF EMBODIMENTS

Hereinafter, one or more embodiments of the present disclosure will be described in detail. However, the scope of the present invention is not limited to the embodiments.

The mechanism by which the effect of the present invention is exhibited or the mechanism by which it works is not clear, but is presumed as follows.

The inventors of the present application have found that the cause of discoloration and fading of the textile-printed fabric over time, even when a swelling agent is used as in the conventional technology, is the bleed-out of the sublimable color material due to insufficient fixing of the sublimable color material to the fabric.

The fabric treatment agent of the present invention is characterized by including a color-material scavenging compound having an Rf value of 0.7 or less according to paper chromatography performed by the above procedures. In the paper chromatography method, cellulose filter paper on which a color-material scavenging compound is fixed is used as a carrier to develop the sublimable color material used for textile printing together with the color-material scavenging compound. In this method, by using the cellulose filter paper to which the color-material scavenging compound is fixed as a carrier, the Rf value, which is a measurement result, can reflect the strength of the CH-π interaction that is assumed to work between a fabric including cellulose fibers or fibers similar to cellulose fibers and a color-material scavenging compound. Also, by using the sublimable color material as the development target, the Rf value, which is a measurement result, can reflect the strength of the π-π interaction that is assumed to work between the sublimable color material and the color-material scavenging compound. That is, the Rf value according to the paper chromatography represents the overall strength of the above CH-π interaction and the above π-π interaction, and in other words, an index of an ability of the color-material scavenging compound to scavenge the color material (the strength of the color-material scavenging compound to fix the sublimable color material to the fabric). The smaller Rf value indicates a higher ability to scavenge the color material.

The color-material scavenging compound having an Rf value of 0.7 or less is considered to have a sufficient ability to scavenge the color material to reduce bleed-out. Thus, it is assumed that the fabric treatment agent of the present invention can reduce the discoloration and fading of the textile-printed fabric.

In addition, the color-material scavenging compound having an Rf value of 0.7 or less when C.I. Disperse Red 60 is used as the sublimable color material that travels through the color-material scavenging compound shows good results even when other dyes are used in actual sublimation transfer. This is considered to be because, by using the C. I. Disperse Red 60 as a development target, the Rf value, which is the measurement result, can reflect the strength of the π-π interactions that is assumed to work between the color-material scavenging compound and the aromatic rings in a commonly used sublimable color material.

According to another aspect of the present invention, it is possible to provide a fabric treatment agent that can achieve both the colorability and the texture, and can also reduce bleed-out of a dye.

The mechanism by which the effect of another aspect of the present invention is exhibited or the mechanism by which it works is not clear, but is presumed to be as follows.

The fabric treatment agent of the present invention includes an aromatic heterocyclic compound and a solvent that has an I/O value (a ratio of an inorganic value of the solvent to an organic value of the solvent) of 1.5 or more. The solvent having the I/O value of 1.5 or more swells the fabric fibers and acts as a carrier for a dye, thereby allowing the dye to easily enter the fibers. In addition, the above aromatic heterocyclic compound can scavenge the dye inside the fiber. As a result, it is assumed that the colorability can be improved without affecting the texture. In addition, bleed-out of the dye over time can be prevented.

Furthermore, when the solvent is removed by heat during transfer, the dye can be fixed firmly and the bleed-out reducing effect can be enhanced.

A fabric treatment agent of an embodiment of the present invention is used in textile printing with a sublimable color material, characterized by including:

a color-material scavenging compound having an Rf value of 0.7 or less according to paper chromatography performed by the above procedures.

This feature is a technical feature common to or corresponding to the following embodiments.

The fabric treatment agent of the embodiment of the present invention preferably includes a color-material scavenging compound that has an Rf value of 0.5 or less, from the viewpoint of the ability to scavenge the color material.

The fabric treatment agent of the embodiment of the present invention preferably further includes a solvent having an I/O value of 1.5 or more, the I/O value being a ratio of an inorganic value of the solvent to an organic value of the solvent. By setting the I/O value in this range, the inside of the fibers of the fabric swells easily, and the solvent functions as a carrier for the sublimable color material, so that the sublimable color material easily enters the inside of the fibers. As a result, the sublimable color material is more easily fixed, and the effects of reducing discoloration and fading are enhanced.

The fabric treatment agent of the embodiment of the present invention preferably includes a color-material scavenging compound having an aromatic ring from the viewpoint of the ability to scavenge the color material.

The fabric treatment agent of the embodiment of the present invention preferably includes a color-material scavenging compound having three or more aromatic rings from the viewpoint of the ability to scavenge the color material.

The fabric treatment agent of the embodiment of the present invention preferably includes a color-material scavenging compound having five or more aromatic rings from the viewpoint of the ability to scavenge the color material.

The fabric treatment agent of the embodiment of the present invention preferably includes a color-material scavenging compound having a structure including two aromatic rings bonded to each other by a single bond from the viewpoint of the ability to scavenge the color material.

The textile printing ink set of the present invention includes a textile printing ink including the sublimable color material and the fabric treatment agent including the color-material scavenging compound. The fabric treatment agent is the fabric treatment agent of the present invention.

The pretreated fabric of the present invention includes a color-material scavenging compound. The color-material scavenging compound has the Rf value of 0.7 or less as determined by paper chromatography under the above procedures.

The textile printing method of the present invention is characterized in that a fabric is dyed with a sublimable color material in the presence of a color-material scavenging compound. In the textile printing method, a color-material scavenging compound having the Rf value of 0.7 or less, as determined by paper chromatography using the above procedures, is used.

In the textile printing method of the embodiment of the present invention, the fabric preferably includes natural fibers or synthetic cellulose fibers, so that the effect of the present invention can be expressed remarkably.

In the textile printing method of the embodiment of the present invention, the dyeing is preferably done by a sublimation transfer method.

The fabric treatment agent of another aspect of the present invention is used in textile printing by a sublimation transfer method and includes: a solvent that has an I/O value of 1.5 or more, the I/O value being a ratio of an inorganic value of the solvent to an organic value of the solvent; and an aromatic heterocyclic compound.

This is a technical feature common to or corresponding to each of the following embodiments.

In the embodiment of the present invention, the fabric treatment agent includes the solvent in a range of 5 to 95% by mass with respect to total of the fabric treatment agent from the viewpoint of high color density.

Also, the aromatic heterocyclic compound is preferably included in the range of 1 to 30% by mass of the total of the fabric treatment agent from the viewpoint of prevention of bleed-out of the dye.

Preferably, the solvent has an I/O value in the range of 1.5 to 5.0 because it can swell the fibers of the fabric.

Preferably, the solvent has a boiling point in a range of 150 to 250° C. to allow the solvent to be removed by heat during transfer.

Further, the solvent preferably includes at least one of dimethyl sulfoxide, ethylene glycol, and propylene glycol because it can swell the fibers of the fabric and achieve high color density.

Preferably, the aromatic heterocyclic compound is a nitrogen-including heterocyclic compound from the viewpoint of the ability to scavenge the dye inside the fibers of the fabric and prevention of bleed-out of the dye. In particular, the nitrogen-including heterocyclic compound is preferably a compounds having at least one selected from a pyrazole ring, a triazole ring, and an imidazole ring.

Preferably, the aromatic heterocyclic compound have a low molecular weight so that the aromatic heterocyclic compound enters the inside of the fibers to scavenge the dye inside the fiber.

Preferably, a textile printing method related to the present invention is done by a sublimation transfer method using a dye and includes: application of the fabric treatment agent to a fabric; and sublimation transfer of the dye. This makes it possible to achieve both the colorability and the texture, and also to reduce bleed-out of a dye.

Preferably, the fabric includes cellulose fibers from the viewpoint that the effect of the present invention can be expressed remarkably.

Preferably, the transfer temperature is higher than the boiling point of the solvent, from the viewpoint that the solvent is removed during the transfer and the dye is more firmly fixed so that the bleed-out reduction effect can be enhanced.

The textile-printed fabric of the present invention includes a dye and an aromatic heterocyclic compound that is derived from the fabric treatment agent. This makes it possible to provide it is possible to provide a textile-printed fabric that has an excellent colorability and texture, and in which the bleed-out of dyes can be reduced.

Hereinafter, the present invention, its constituent elements, and modes and embodiments for carrying out the present invention will be described. In this application, "to" is used in the sense that it includes the numerical values described before and after "to" as the lower and upper limits.

1. Fabric Treatment Agent

A fabric treatment agent of the present invention (also called "pretreatment agent for fabric" or "pretreatment agent") is a fabric treatment agent used for textile printing using sublimable color materials, and is characterized by including a color-material scavenging compound having an Rf value of 0.7 or less, as determined by paper chromatography using the following procedures.

1.1 Conditions for Paper Chromatography Method

Procedures for the paper chromatography method according to the present invention is detailed below.

Procedures for Paper Chromatography Method

Procedure 1: Cellulose filter paper is impregnated with a 10% solution of the color-material scavenging compound and then dried to prepare a carrier.

Procedure 2: A 0.1% solution of a sublimable color material in tetrahydrofuran is spotted on the carrier and then dried to prepare a development sample.

Procedure 3: The development sample is developed using acetonitrile as a solvent for 3 minutes at 25° C.

Procedure 4: The Rf value is calculated by the following formula.

$$Rf = \frac{\text{(distance travelled by the sublimable color material)}}{\text{(distance travelled by acetonitrile)}}$$

Details of the procedures are each explained below.

Procedure 1

A cellulose filter paper No. 5C according to JIS P 3801: 1995 is impregnated with a 10% solution of the color-material scavenging compound, and then dried to prepare a carrier. The solvent used for the 10% solution of the color-material scavenging compound is not limited as long as it can dissolve the color-material scavenging compound, and may be, for example, a solvent that can be included in the fabric treatment agent. The shape of the cellulose filter paper is not particularly limited, and can be, for example, in the form of a strip. The size of the cellulose filter paper is not particularly limited, but it needs to be large enough to allow for the development in Procedure 3. Impregnation of the cellulose filter paper with the solution is done by immersing the cellulose filter paper in the solution for 1 minute. Conditions for drying are not particularly limited, as long as the paper can be sufficiently dried to an extent that the mass of the carrier is stabilized under 25° C. and 50% RH environment.

Procedure 2

A 0.1% solution of a sublimable color material (sublimable color material used for textile printing together with the color-material scavenging compound) in tetrahydrofuran is spotted on the carrier and then dried to prepare a development sample. Spotting of the solution can be done using a capillary. The volume of solution to be spotted is preferably 0.5 to 2 μL, and more preferably 1 μL. The solution is spotted at a position 1 cm above the bottom edge of the cellulose filter paper. Conditions for drying are not particularly limited, as long as the development sample can be sufficiently dried to an extent that the mass of the development sample is stabilized under 25° C. and 50% RH environment.

Procedure 3

The development sample is developed using acetonitrile as a solvent for 3 minutes at 25° C. Specifically, the development sample is placed upright in a container for development including acetonitrile, such that the portion where the solution has been spotted in Procedure 2 is not immersed in acetonitrile. The container for development is covered with a lid and the development is done. The development time is three minutes after the cellulose filter paper starts to be immersed in the acetonitrile.

Procedure 4

The Rf value is calculated by the following formula.

$$Rf = \frac{\text{(distance travelled by the sublimable color material)}}{\text{(distance travelled by acetonitrile)}}$$

The "distance travelled by the sublimable color material" is defined as the distance from the center of the portion where the solution has been spotted in Procedure 2 to the darkest position of the spot after the development. When it is difficult to determine the darkest position, it is defined as the distance from the center of the portion where the solution has been spotted in Procedure 2 to the middle of the leading edge and trailing edge of the spot after the development.

The "distance travelled by acetonitrile" is defined as the distance from the center of the portion where the solution has been spotted in Procedure 2 to the leading edge of the spot after the development.

The Rf value may be an average of values measured multiple times, considering the accuracy of the measurement.

For the fabric treatment agent including the color-material scavenging compound having the Rf value of 0.7 or less when the sublimable color material is C.I. Disperse Red 60, the Rf value is measured in the same procedure as in Procedure 2, except that C.I. Disperse Red 60 is substituted for the sublimable color material in procedure 2.

1.2 Color-Material Scavenging Compound

The fabric treatment agent of the present invention is characterized by including a color-material scavenging compound with having the Rf value of 0.7 or less as determined by paper chromatography using the above procedures. From the viewpoint of the ability to scavenge the color material, the Rf value is preferably 0.5 or less, more preferably 0.3 or less, and even more preferably 0.2 or less.

The color-material scavenging compound of the present invention is preferably a compound having an aromatic ring (aromatic compound), and is more preferably a compound having an aromatic heterocyclic ring (aromatic heterocyclic compound).

In the present invention, the "aromatic heterocyclic ring" refers to an aromatic ring including a carbon atom(s) and a heteroatom(s) that is not a carbon atom as members of the aromatic ring, and does not include an aromatic ring composed of only carbon atoms as members of the aromatic ring and having a substituent(s) including a heteroatom(s) on the aromatic ring.

From the viewpoint of the ability to scavenge the color material, the heteroatom composing the aromatic heterocyclic ring of the aromatic heterocyclic compound is preferably an oxygen atom, a nitrogen atom, or a sulfur atom, and more preferably a nitrogen atom.

Examples of the aromatic heterocyclic ring of the aromatic heterocyclic compound include a pyrazole ring, a triazole ring, an imidazole ring, a triazine ring, a pyridine ring, an alidine ring, an indole ring, a quinoline ring, a pyrrole ring, a thiophene ring, and the like. Among these, a pyrazole ring, a triazole ring, and an imidazole ring are preferred from the viewpoint of the ability to scavenge the color material.

An aromatic compound used as the color-material scavenging compound preferably has three or more aromatic rings, and more preferably has five or more aromatic rings. The aromatic compound used as the color-material scavenging compound preferably has a structure including two aromatic rings bonded to each other by a single bond, either in part or as a whole. When an aromatic compound has these structures, the π-π interaction with the sublimating color material becomes stronger due to its higher aromaticity. This improves the ability to scavenge the color material and enhances the effects of reducing discoloration and fading.

The color-material scavenging compound of the present invention preferably has a solubility of 10% by mass or more in a solvent also included in the fabric treatment agent at 25° C. and 1 atm. When the solubility in the solvent is higher, the color-material scavenging compound can easily enter the fibers of the fabric in a dissolved state. This improves the ability to scavenge the color material and enhances the effects of reducing discoloration and fading.

Examples of the color-material scavenging compound of the present invention are shown below. However, the color-material scavenging compound of the present invention is not limited to these.

Compound(1)

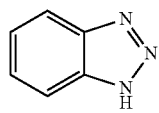

Compound(2)

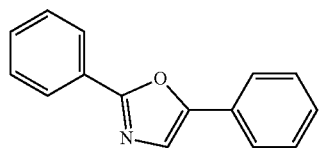

Compound(3)

Compound(4)

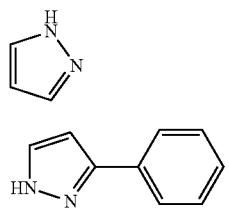

Compound(5)

Compound(6)

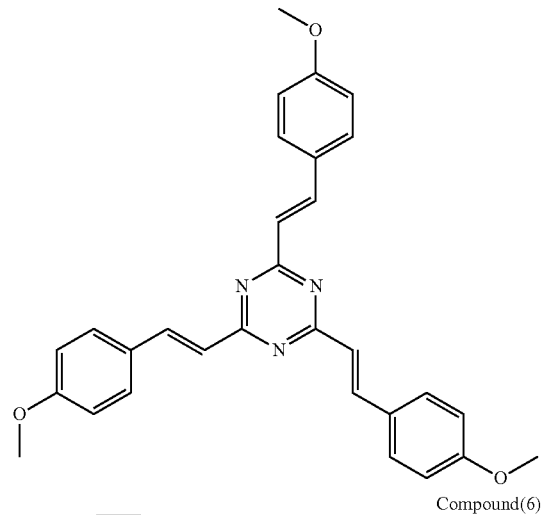

Compound(7)

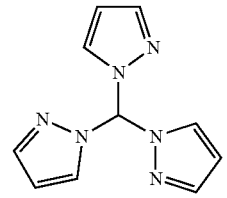

Compound(8)

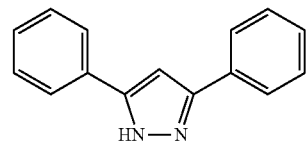

Compound(9)

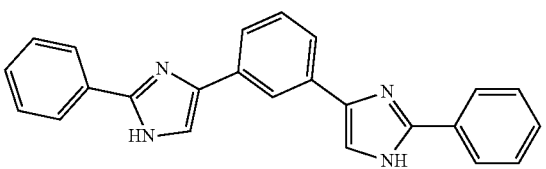

Compound(10)

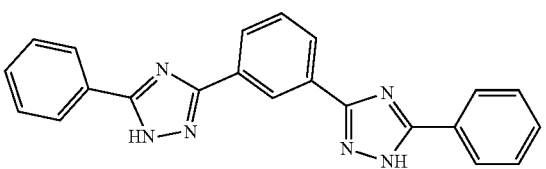

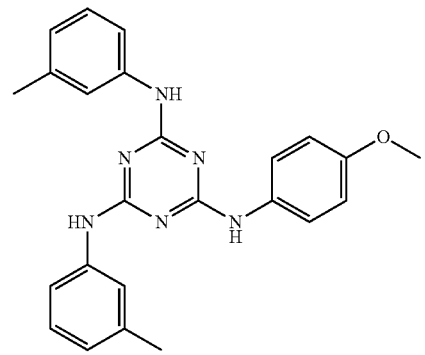

Compound(11)

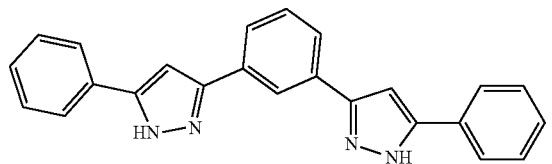

Compound(12)

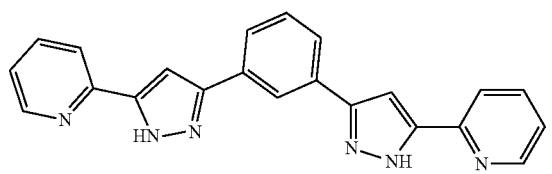

Compound(13)

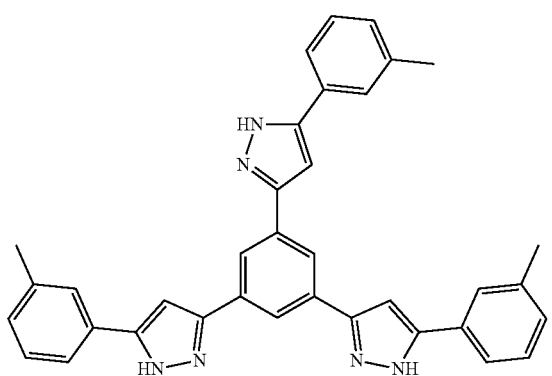

Aromatic Heterocyclic Compound

In another aspect of the present invention, the fabric treatment agent includes an aromatic heterocyclic compound.

In the present invention, the "aromatic heterocyclic compound" refers to a compound including a carbon atom(s) and a heteroatom(s) that is not a carbon atom as members of the aromatic ring, and does not refer to a compound including an aromatic ring composed of only carbon atoms as members of the aromatic ring and having a substituent(s) including a heteroatom(s) on the aromatic ring.

From the viewpoint of the ability to scavenge the dye, the aromatic heterocyclic compound of the present invention preferably has a heteroatom composing the aromatic ring selected from an oxygen atom, a nitrogen atom, and a sulfur atom, and is more preferably a nitrogen-including heterocyclic compound having a nitrogen atom.

Examples of the nitrogen-including heterocyclic compound include compound having a pyrazole ring, a triazole ring, an imidazole ring, a triazine ring, a pyridine ring, an alidine ring, an indole ring, a quinoline ring, a pyrrole ring, a thiophene ring, and the like. In particular, it is preferably a compound having at least one selected from a pyrazole ring, a triazole ring, and an imidazole ring from the viewpoint of the ability to scavenge the dye.

Specific examples include Example compounds (a1) to (a11) represented by the following structural formulas.

(a1)

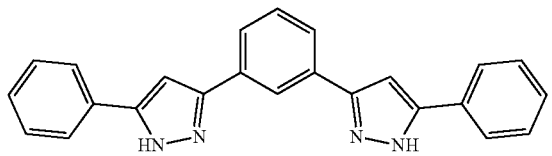

(a2)

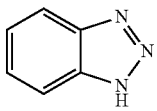

(a3)

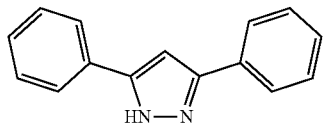

(a4)

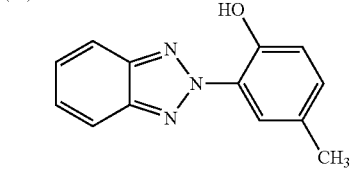

(a5)

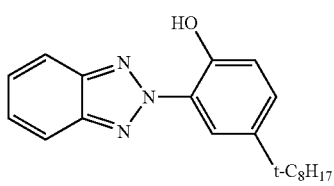

(a6)

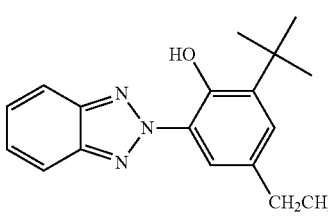

-continued

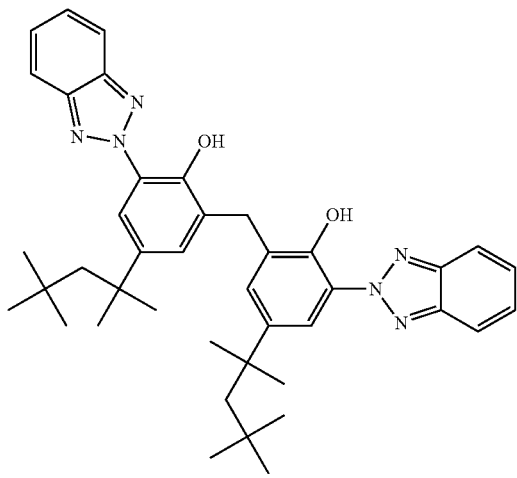
(a7)

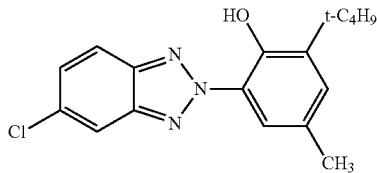
(a8)

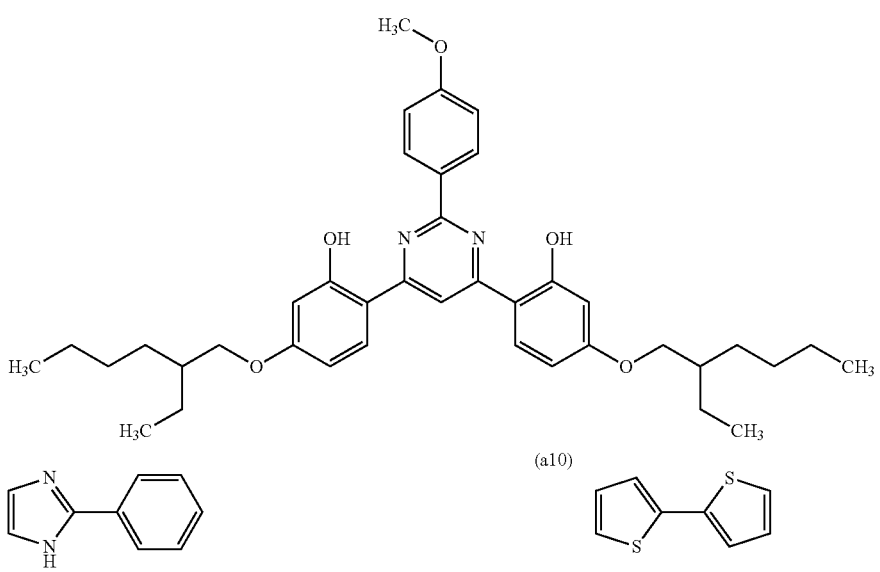
(a9)

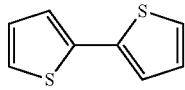
(a10)

(a11)

Preferably, the color-material scavenging compound and the aromatic heterocyclic compound of the present invention have a low molecular weight such that the dye can be scavenged inside the fibers of the fabric.

The low molecular weight is, for example, in the range of 200 to 1000.

Preferably, the color-material scavenging compound and the aromatic heterocyclic compound of the present invention is included in the range of 1 to 30% by mass of the total of the fabric treatment agent, and more preferably in the range of 10 to 20% by mass from the viewpoint of the ability to scavenge the dye.

1.3 Solvent

The fabric treatment agent of an embodiment of the present invention can include a solvent. The type of the solvent is not particularly limited, but has a value of the ratio of inorganic value to organic value (I/O value) of preferably 1.5 or more, more preferably in the range of 1.5 to 5.0, and even more preferably in the range of 1.5 to 2.0. By setting the I/O value in this range, the inside of the fibers of the fabrics wells easily, and the solvent functions as a carrier for the sublimable color material, making it easier for the sublimable color material to enter the inside of the fibers. As a result, the sublimable color material is more easily fixed, and the effects of reducing discoloration and fading are enhanced.

The "I/O value" is the ratio of the inorganic value (I) to the organic value (O) (inorganic value/organic value), is also called an "IOB value" (Inorganic Organic Balance: IOB), and is one of indicators that shows the degree of polarity of a compound or material.

The I/O value is explained in detail in documents such as "Organic Conceptual Diagram" (Yoshio Koda, Sankyo Shuppan, 1984), "KUMAMOTO PHARMACEUTICAL BULLETIN" (No. 1, pp. (No. 1, section 1-16, 1954), and "The Domain of Chemistry" (Vol. 11, No. 10, Sections 719-72-5, 1957). The I/O value is calculated by treating the polarity of a compound or a member in an organic conceptual manner, which is a type of functional group contribution method including setting of parameters for each functional group. The inorganic and organic values are shown for each functional group. The properties of the compound or material is roughly classified into an organic group exhibiting a covalent bond property and an inorganic group exhibiting an ionic bond property, and the I/O value is positioned on an orthogonal coordinate having an organic axis and an inorganic axis.

The "inorganic value (I)" is a numerical value based on a hydroxyl group, which indicates a magnitude of an influence of each of various substituents or bonds, etc., of an organic compound on a boiling point. Specifically, the distance between a boiling point curve of a linear alcohol and a boiling point curve of a linear paraffin taken in the vicinity of 5 carbon atoms is about 100° C. Therefore, the influence of one hydroxy group is numerically defined to be 100. The numerical value of an influence of each of various substituents or various bonds, etc., on a boiling point based on this numerical value of 100 is the inorganic value (I) of a substituent that the organic compound has. For example, a —COOH group has an inorganic value (I) of 150 and a double bond has an inorganic value (I) of 2. Therefore, an inorganic value (I) of a certain type of organic compound means the sum of the inorganic values (I) of various substituents or bonds, etc., that the compound has.

The "organic value (O)" is defined based on an influence of a carbon atom represented by a methylene group in a molecule, which is taken as a unit, on a boiling point. Namely, an average value of an increase in a boiling point due to addition of one carbon atom in the vicinity of 5 to 10 carbon atoms of a linear saturated hydrocarbon compound is 20° C., and an organic value of one carbon atom is set to 20 based thereon. Based on this value, a numerical value of an influence of each of various substituents or bonds, etc., on a boiling point is obtained as the organic value (O). For example, the organic value (O) of a nitro group (—$NO_2$) is 70.

Generally, the closer the I/O value comes to 0, the more non-polar (more hydrophobic and organic) an organic substance is, while the larger the value is, the more polar (more hydrophilic and inorganic) an organic substance is.

Examples of the solvent having the I/O value of 1.5 or more include: ethylene glycol monoethylene ether (I/O value: 1.5), dimethyl sulfoxide (I/O value: 1.75), butyric acid (I/O value: 1.875), polyethylene glycol (I/O value: 2.0), isobutyric acid (I/O value: 2.143), 2,3-butanediol (I/O value: 2.5), trimethylolethane (I/O value: 3.0), propylene glycol (I/O value: 3.3), polypropylene glycol (I/O value: 3.3), ethylene glycol (I/O value: 5.0), and the like. Among these, one or more of dimethyl sulfoxide, ethylene glycol, and propylene glycol are preferably included because they can swell the fibers of the fabric and reduce discoloration and fading.

The boiling point of the solvent is preferably in the range of 150 to 250° C. Examples of the solvent whose boiling point is in the range of 150 to 250° C. include propylene glycol (boiling point: 188° C.), ethylene glycol (boiling point: 197° C.), dimethyl sulfoxide (boiling point: 189° C.), 2,3-butanediol (boiling point: 177° C.), and the like.

In addition to the solvents listed above, for example, 2-pyrrolidone (I/O value: 1.15) can also be used.

In the fabric treatment agent, the above solvent is preferably included in the range of 5 to 95% by mass with respect to the total fabric treatment agent from the viewpoint of reducing discoloration and fading, and is more preferably included in the range of 50 to 80% by mass.

1.4 Other Ingredients

The fabric treatment agent may further include other ingredients other than those listed above as needed. Examples of other ingredients include water, a surfactant, a preservative, a pH adjuster, and the like.

Examples of water include ion-exchanged water, distilled water, pure water, and the like. The water content in the fabric treatment agent is preferably in the range of 0 to 95% by mass, and is more preferably in the range of 0 to 50% by mass.

Surfactants can be used without limitation, but when an anionic compound is included as an ingredient of the ink, the ionic property of the surfactant is preferably anionic, nonionic, or betaine type. Specific examples of the preferably used surfactant include a fluorine-based or silicone-based surfactant having a high ability to reduce static surface tension, an anionic surfactant such as dioctyl sulfosuccinate and sodium dodecyl sulfate having a high ability to reduce dynamic surface tension, relatively low molecular weight nonionic surfactants such as polyoxyethylene alkyl ethers, polyoxyethylene alkylphenyl ethers, acetylene glycols, Pluronic surfactants ("Pluronic" is registered trademark), and sorbitan derivatives. It is also preferable to use a combination of a fluorine-based or silicone-based surfactant and a surfactant having a high ability to reduce dynamic surface tension.

Examples of the preservative include aromatic halogen compounds (for example, Preventol CMK), methylene dithiocyanate, halogen-including nitrogen-sulfur compounds, and 1,2-benzisothiazoline-3-one (for example, PROXEL GXL).

Examples of the pH adjuster include citric acid, sodium citrate, hydrochloric acid, sodium hydroxide, and the like.

1.5 Physical Property of Fabric Treatment Agent

The viscosity of the fabric treatment agent at 25° C. can be adjusted appropriately depending on the method of application to the fabric. For example, when the fabric treatment agent is applied by inkjet method, the viscosity of the fabric treatment agent is preferably in the range of 4 to 20 mPa·s. The viscosity of the fabric treatment agent can be measured at 25° C. using an E-type viscometer.

2. Textile Printing Ink Set

The textile printing ink set of the present invention includes a textile printing ink including the sublimable color material and the fabric treatment agent including the color-material scavenging compound. The fabric treatment agent is the fabric treatment agent of the present invention.

The fabric treatment agent included in the textile printing ink set is as described above. The textile printing ink included in the textile printing ink set is described below.

3. Textile Printing Ink

The textile printing ink included in the textile printing ink set of the present invention includes at least a sublimable color material. In addition to the sublimable color material, the ink may also include water, an organic solvent, a dispersing agent, and the like.

3.1 Sublimable Color Material

In the present invention, the term "sublimable color material" refers to a color material that has a sublimation property upon heating.

The sublimable color material is preferably a dispersible dye that is insoluble or difficult to be dissolved in water.

Here, insoluble or difficult to be dissolved in water means that the solubility in water at 25° C. is 10 mg/L or less, preferably 5 mg/L or less, and more preferably 1 mg/L or less.

The chemical structure of the sublimable color material is not particularly limited, but preferably has multiple aromatic rings. By having multiple aromatic rings, the π-π interaction between the color-material scavenging compound and the sublimable color material works strongly, and the sublimable color material is more easily fixed to the fabric.

The types of the dispersible dye are not particularly limited and include an azo-based dye, an anthraquinone-based dye, and the like. Specific examples of the sublimable dye among the dispersible dyes include the followings.

C. I. Disperse Yellow 3, 4, 5, 7, 9, 13, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 114, 116, 118, 119, 122, 124, 126, 135, 140, 141, 149, 160, 162, 163, 164, 165, 179, 180, 182, 183, 186, 192, 198, 199, 202, 204, 210, 211, 215, 216, 218, 224, and the like.

C. I. Disperse Orange 1, 3, 5, 7, 11, 13, 17, 20, 21, 25, 29, 30, 31, 32, 33, 37, 38, 42, 43, 44, 45, 47, 48, 49, 50, 53, 54, 55, 56, 57, 58, 59, 61, 66, 71, 73, 76, 78, 80, 89, 90, 91, 93, 96, 97, 119, 127, 130, 139, 142, and the like.

C. I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 289, 298, 302, 303, 310, 311, 312, 320, 324, 328, and the like.

C. I. Disperse Violet 1, 4, 8, 23, 26, 27, 28, 31, 33, 35, 36, 38, 40, 43, 46, 48, 50, 51, 52, 56, 57, 59, 61, 63, 69, 77, and the like.

C.I. Disperse Green 9 and the like.

C.I. Disperse Brown 1, 2, 4, 9, 13, 19, and the like.

C. I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, 359, 360, and the like.

C. I. Disperse Black 1, 3, 10, 24, and the like.

The molecular weight of the sublimable color material is not particularly limited, but from the viewpoint of facilitating sublimation of the sublimable color material, a low molecular weight (for example, from 200 to 350) is preferred. On the other hand, from the viewpoint of making it difficult for the sublimable color material that has been absorbed into the fabric to escape, a moderately high molecular weight (for example, from 350 to 500) is preferred.

The sublimable color material included in the textile printing ink may be or may not be crystallized. The ink is applied to an object, for example, by the inkjet method, which ensures highly accurate textile printing.

The average particle size of the sublimable color material in the textile printing ink is not particularly limited, but from the viewpoint of stable injection by the inkjet method, for example, it can be 300 nm or less. The average particle diameter can be determined with a commercially available particle size analyzer based on the light scattering, electrophoresis, laser Doppler method, or the like. An example of the particle size measuring instrument is the Zetasizer 1000 (manufactured by Malvern Panalytical Ltd.)

The content of sublimable color material in the textile printing ink is not particularly limited, but is preferably in the range of 2 to 10% by mass of the total textile printing ink. When the content of the sublimable color material is 2% by mass or more, it is easy to form a high density image, and when the content is 10% by mass or less, the viscosity of the textile printing ink is not too large, and thus the injection stability is not easily impaired. From the same viewpoint, the content of the sublimable color material is preferably in the range of 5 to 10% by mass of the total textile printing ink.

3.2 Water

Examples of water that can be included in the textile printing ink include ion-exchanged water, distilled water, pure water, and the like. The water content in the textile printing ink is preferably in the range of 40 to 98% by mass, and more preferably in the range of 50 to 70% by mass.

3.3 Organic Solvent

An organic solvent that can be included in the textile printing ink preferably includes a water-soluble organic solvent. The total content of water and water-soluble organic solvent is preferably in the range of 90 to 98% by mass, and more preferably in the range of 90 to 95% by mass with respect to the total of the textile printing ink.

Examples of the water-soluble organic solvent include alcohols (for example, methanol, ethanol, propanol, pentanol, hexanol, cyclohexanol, and benzyl alcohol), polyhydric alcohols (for example, ethylene glycol, diethylene glycol, triethylene glycol, polyethylene glycol, propylene glycol, dipropylene glycol, tripropylene glycol, polypropylene glycol, glycerin, and a compound represented by the following General Formula (1)), polyhydric alcohol ethers (for example, ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monobutyl ether, diethylene glycol dimethyl ether, propylene glycol monomethyl ether, and propylene glycol monoethyl ether), amines (for example, ethanolamine, N-ethyldiethanolamine, morpholine, N-ethylmorpholine, ethylenediamine, and diethylenediamine, and triethylenetetetramine), amides (for example, formamide, N,N-dimethylformamide, and N,N-dimethylacetamide), heterocycles (for example, 2-pyrrolidone, N-methyl-2-pyrrolidone, N-cyclohexyl-2-pyrrolidone, 2-oxazolidone, and 1,3-dimethyl-2-imidazolidine), sulfoxides (for example, dimethyl sulfoxide), and sulfones (for example, sulfolane).

General Formula (1)

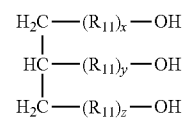

[In General Formula (1), $R_{11}$ represents an ethylene glycol group or a propylene glycol group, x, y, and z each are a positive integer, and $3 \leq (x+y+z) \leq 30$.]

When the fabric includes hydrophilic fibers such as natural fibers or synthetic cellulose fibers, from the viewpoint of facilitating the textile printing ink to penetrate into the fabric and from the viewpoint of not easily impairing the injection stability in the inkjet method, it is preferable that the ink does not thicken easily due to drying. Therefore, the textile printing ink preferably includes, among water-soluble organic solvents, a high boiling point solvent having a boiling point of 200° C. or higher.

The high boiling point solvent having a boiling point of 200° C. or higher is preferably a polyol or a polyalkylene oxide. Examples of the polyol having a boiling point of 200° C. or higher include divalent alcohols such as 1,3-butanediol (boiling point: 208° C.), 1,6-hexanediol (boiling point: 223° C.), and polypropylene glycol; and tri- or more valent alcohols such as glycerin (boiling point: 290° C.), trimethylolpropane (boiling point: 295° C.). Examples of the polyalkylene oxide having a boiling point of 200° C. or higher include diethylene glycol monoethyl ether (boiling point: 202° C.), triethylene glycol monomethyl ether (boiling point: 245° C.), tetraethylene glycol monomethyl ether (boiling point: 305° C.), tripropylene glycol monoethyl ether (boiling point: 256° C.); and ether of divalent alcohols such as polypropylene glycol, and ether of an alcohol of trivalent or higher such as glycerin (boiling point: 290° C.), and hexanetriol.

The content of the water-soluble organic solvent is not particularly limited, but is preferably in a range of 20 to 70% by mass of the total textile printing ink. When the content of the water-soluble organic solvent is 20% by mass or more of the total textile printing ink, the dispersibility and ejection property of the sublimable color material are more easily enhanced, and when the content is 70% by mass or less, the drying property of the textile printing ink is not easily impaired.

3.4 Dispersing Agent

The dispersing agent that can be included in the textile printing ink can be selected according to the type of the sublimable color material. Examples of the dispersing agent include formalin condensate of sodium creosote oil sulfonate, formalin condensate of sodium cresol sulfonate and sodium 2-naphthol-6-sulfonate, formalin condensate of sodium cresol sulfonate, formalin condensate of sodium phenol sulfonate, formalin condensate of sodium β-naphthol sulfonate, formalin condensate including sodium β-naphthalene sulfonate and sodium β-naphthol sulfonate, alkylene oxide including ethylene oxide and propylene oxide, fatty alcohols, fatty amines, fatty acids, phenols, alkylphenols and alkylatable compounds including amine carboxylates, lignin sulfonates, sodium paraffin sulfonates, copolymers of α-olefins and maleic anhydride, and known comb-shaped block polymers.

Examples of the comb-shaped block polymer include DISPERBYK-190, DISPERBYK-194N, DISPERBYK-2010, DISPERBYK-2015, and BYK-154, manufactured by BYK Chemie, Co., Ltd. ("DISPERBYK" and "BYK" are registered trademarks of the same company.)

The content of the dispersing agent is not particularly limited, but is preferably in a range of 20 to 200 parts by mass with respect to 100 parts by mass of the sublimable color material. When the content of the dispersing agent is 20 parts by mass or more, the dispersibility of the sublimable color material tends to be more enhanced, and when the content is 200 parts by mass or less, deterioration in ejection property due to the dispersing agent tends to be reduced.

3.5 Other Ingredients

The textile printing ink may further include other ingredients as needed. Examples of other ingredients include a surfactant, a preservative, a pH adjuster, and the like. These can be the same as the surfactant, preservative, and pH adjuster that the fabric treatment agent can include.

3.6 Physical Properties of Textile Printing Ink

The viscosity of the textile printing ink at 25° C. may be any degree as long as the ejection property by the inkjet method becomes good, and is not particularly limited, but is preferably in a range of 3 to 20 mPas, and more preferably in a range of 4 to 12 mPas. The viscosity of the ink can be measured with an E-type viscometer at 25° C.

<3.7 Textile Printing Ink including Color-Material Scavenging Compound>

The color-material scavenging compound described above can also be included in the textile printing ink. By using the textile printing ink including the color-material scavenging compound, it is possible to eliminate the need for using the fabric treatment agent and pretreatment of the fabric with the agent, while still achieving the effect of reducing discoloration and fading by the color-material scavenging compound.

The textile printing ink including the color-material scavenging compound does not require the fabric treatment agent or pretreatment of the fabric with it, but can be used for fabric pretreated with the fabric treatment agent (pretreated fabric).

4. Textile Printing Method

The textile printing method of the present invention is characterized in that a fabric is dyed with a sublimable color material in the presence of a color-material scavenging compound. In the textile printing method, a color-material scavenging compound having the Rf value of 0.7 or less, as determined by paper chromatography using the above procedures, is used.

In the present invention, dyeing "in the presence of color-material scavenging compound" includes dyeing a fabric pretreated with a fabric treatment agent including a color-material scavenging compound (a pretreated fabric), simultaneous treatment with the fabric treatment agent including the color-material scavenging compound and application of textile printing ink, and dyeing with the textile printing ink including the color-material scavenging compound. In either case, the presence of the color-material scavenging compound makes it easier for the sublimable color material to fix to the fabric and reduce discoloration and fading.

4.1 Fabric

The fibers included in the fabric are not particularly limited, but include natural fibers (including natural cellulose fibers, hemp, wool, silk, and the like), synthetic cellulose fibers (including recycled cellulose fibers such as rayon, and semi-synthetic cellulose fibers such as acetate), vinylon fibers, nylon fibers, acrylic fibers, polyurethane fibers, and polyester fibers.

The fabric preferably includes natural fibers or synthetic cellulose fibers, since the effect of the present invention can be remarkably expressed, and more preferably includes natural fibers or synthetic cellulose fibers at 30% by mass or more. Among natural fibers, natural cellulose fibers such as cotton fibers are particularly preferred. The fabric may be composed of one type of natural fiber or two or more types of natural fibers. The fabric including the natural fibers may further include one or more types of chemical fibers. When the fabric includes cellulose fibers and other fibers other than cellulose fibers, it is preferred that the other fibers include polyester fibers.

The fabric may be any form of these fibers, such as a woven fabric, a non-woven fabric, or a knitted fabric. The fabric may also be a blended woven fabric or a blended nonwoven fabric of two or more types of fibers.

The natural fiber ratio and the chemical fiber ratio in the fibers composing the fabric are respectively expressed as the mass percentages of the included natural fibers and chemical fibers with respect to the total amount of fabric (the total amount of natural fibers and chemical fibers). When the fabric of the present invention includes natural fibers and optionally chemical fibers, the natural fiber ratio in the fabric is preferably in the range of 5 to 100% by mass, and the chemical fiber ratio is preferably 0 to 95% by mass. For example, when the fabric includes cellulose fibers and polyester fibers, the cellulose fiber ratio is preferably in the range of 35 to 100% by mass, and the polyester fiber ratio is preferably in the range of 0 to 65% by mass.

4.2 Pretreatment Step

When dyeing the pretreated fabric (the fabric pretreated with the fabric treatment agent), a pretreatment step is required. In the pretreatment step, the fabric treatment agent is applied to at least a part of a surface of the fabric. The fabric treatment agent may be applied to an entire surface of the fabric, or it may be applied selectively only to the area to be dyed with the sublimable color material, depending on the image to be printed.

Known methods can be used without limitation in applying the fabric treatment agent to the fabric. Specific examples include methods such as spraying, a mangle method (a padding method or a dipping method), a coating method, an inkjet method, and the like. The inkjet method is preferred from the viewpoint of continuous application of textile printing ink including sublimable color material in the dyeing process described below, for example. The mangle method or coater method is preferred from the viewpoint of applying a predetermined amount of fabric treatment agent in a short time.

In the mangle method, the fabric is dipped into the fabric treatment agent stored in a tank, and then the fabric is squeezed to adjust the amount of fabric treatment agent to be applied. The temperature of the fabric treatment agent is not particularly limited, but can be 15 to 30° C. The conditions in the inkjet printing method can be the same as those in the application of the textile printing ink in the dyeing process.

The application amount of the fabric treatment agent is not particularly limited and can be adjusted according to the content of the color-material scavenging compound in the fabric treatment agent, the application amount of the textile printing ink, and the like.

After the fabric treatment agent is applied to the fabric, the solvent may be removed from the coating of the fabric treatment agent on the fabric (i.e., in a drying step), however, it is preferable that the solvent remains. The drying method is not particularly limited, and is preferably heating with warm air, a hot plate, or a heat roller. From the viewpoint of removing the liquid medium sufficiently in a short time, heat drying is preferable. The temperature for drying is preferably in the range of 100 to 130° C.

4.3 Dyeing Step

Examples of the dyeing method in the dyeing step include a sublimation transfer method, in which the textile printing ink is applied to a transfer medium and then transferred from the transfer medium to the fabric for dyeing, and a direct sublimation method, in which the textile printing ink is directly applied to the fabric. The sublimation transfer method is preferred from the viewpoint of achieving the effect of the present invention.

When dyeing the pretreated fabric, the pretreated fabric is preferably in an un-dried state. Specifically, the fabric treatment agent preferably remains 20% by mass or more with respect to the fabric before pretreatment. This makes the inside of the fibers of the fabric swollen, so that the sublimable color material can be more easily fixed and the effect of reducing discoloration and fading will be enhanced.

Sublimation Transfer Method

In dyeing by the sublimation transfer method, the textile printing ink is first applied to the transfer medium, and then dried to form an ink layer (transfer image) corresponding to the image to be printed. The application method of the textile printing ink is not particularly limited, but the inkjet method is preferred because it enables high-precision printing.

The transfer medium used in dyeing by the sublimation transfer method is not particularly limited as long as an ink layer can be formed on the surface of the transfer medium so as to be further transferred onto a fabric, for example, a medium does not interfere with sublimation of the sublimable color material during transfer. The transfer medium is preferably a sheet of paper having an ink-receiving layer formed on the surface with inorganic fine particles such as silica, and include, for example, a specialized sheet for inkjet printing and a transfer sheet.

Next, the surface of the image to be transferred on the transfer medium is brought into contact with the surface of the fabric (including the pretreated fabric) and heated (heat pressed). As a result, the sublimable color material in the image to be transferred formed on the transfer medium is sublimely transferred to the fabric so that the fabric is dyed.

The transfer temperature (heat press temperature) depends on the sublimation temperature of the sublimable color material, but is preferably in the range of 180 to 210° C., for example. In particular, the transfer temperature is preferably higher than the boiling point of the solvent included in the fabric treatment agent, in order that the solvent is removed by the transfer and the dye is more firmly fixed so that the bleed-out reduction effect can be enhanced. The pressing pressure is preferably in the range of 200 to 500 g/cm$^2$ for a flat type, and in the range of 2 to 6 kg/cm$^2$ for a continuous type. The pressing time depends on the transfer temperature and pressing pressure, but is preferably in the range of 30 seconds to 180 seconds.

In a thermal transfer, the image to be transferred is preferably thermally transferred onto the fabric before the fabric treatment agent applied to the fabric has completely dried. As a result, the solvent in the fabric treatment agent makes the fibers of the fabric swell easily and acts as a carrier for the transferred dye, thereby allowing the dye to easily enter the fibers to improve the colorability and the texture. In addition, a dye scavenging agent or an aromatic heterocyclic compound in the fabric treatment agent also scavenges the transferred dye and reduces bleed-out of dye.

Direct Sublimation Method

In dyeing by the direct sublimation method, textile printing ink is directly applied to the fabric (including the pretreated fabric) depending on the image to be printed. The application method of the textile printing ink is not particularly limited, but the inkjet method is preferred because it enables high-precision printing. In the inkjet method, specifically, an inkjet recording device is used to eject droplets of the textile printing ink from the inkjet recording head onto the fabric.

The surface temperature of the fabric when the textile printing ink droplets land is not particularly limited, but the fabric may be heated to a temperature in the range of 35 to 70° C. to reduce blotting of the image before color development.

By heating the ink film after landing, the sublimable color material is sublimated and the fabric is dyed. The heating method may be any conventionally known method, and is suitably selected according to the type of the textile printing ink, the color-material scavenging compound, and the fabric. Examples of the heating method include steaming by steam; baking and/or thermosol by dry heat; HT steaming with superheated steam; and heat pressing. Among these, the steaming, baking, and heat press methods are preferred. The heating temperature is not particularly limited, but can be, for example, 95° C. or more and less than 220° C.

5. Pretreated Fabric

The pretreated fabric of the present invention includes a color-material scavenging compound. The color-material scavenging compound has the Rf value of 0.7 or less as determined by paper chromatography under the above procedures.

In the present invention, the "pretreated fabric including the color-material scavenging compound" means a fabric in which the color-material scavenging compound is physically or chemically adsorbed on the fibers of the fabric.

The pretreated fabric can be obtained by performing the above-mentioned pretreatment on the fabric.

The textile-printed fabric of the present invention includes the color-material scavenging compound and the sublimable color material. The color-material scavenging compound has the Rf value of 0.7 or less as determined by paper chromatography under the above procedures.

The textile-printed fabric can be obtained by textile printing as described above on the fabric, specifically by dyeing the fabric using at least one of the textile printing ink including the color-material scavenging compound and the pretreated fabric.

The textile-printed fabric of another aspect of the present invention includes an aromatic heterocyclic compound and a dye. The aromatic heterocyclic compound is characterized in that it is derived from the fabric treatment agent of the present invention. That is, the textile-printed fabric of the present invention is obtained by thermally transferring the transfer image formed on the transfer medium using, for example, a dispersive dye to the fabric to which the fabric treatment agent including the solvent having an I/O value of 1.5 or more and the aromatic heterocyclic compound has been applied.

In the present invention, "textile-printed fabric including the color-material scavenging compound or the aromatic heterocyclic compound and the dye" means a fabric in which the color-material scavenging compound or the aromatic heterocyclic compound and the dye exist so as to fill gaps between fibers composing the fabric by physical interaction (for example, physically adsorbed), or a fabric in which the fibers, the aromatic heterocyclic compound, and the dye are chemically bonded to each other (for example, chemically adsorbed).

EXAMPLES

Hereinafter, the present invention will be specifically described with reference to examples, but the present invention is not limited thereto. In the following examples, unless otherwise noted, the operations were performed at room temperature (25° C.). Unless otherwise noted, "%" and "part" mean "% by mass" and "part by mass", respectively.

Example 1

Preparation of Fabric Treatment Agent

Fabric treatment agents 1 to 16 were prepared by mixing the color-material scavenging compound and the solvent in the combinations listed in Table I such that the content of the color-material scavenging compound was 20% by mass.

The compounds used as the color-material scavenging compounds were Compounds (3), (7), (10), (11), and (13) described above.

The Rf value for each of the respective color-material scavenging compounds in Table 1 was obtained by paper chromatography under the following procedures.

Procedures for Paper Chromatography Method

Procedure 1: A cellulose filter paper No. SC according to JIS P 3801:1995 was impregnated with a 10% solution of the color-material scavenging compound, and then dried to prepare a carrier. The solvent used for the 10% solution of the color-material scavenging compound was a solvent of the same type as the solvent included in the fabric treatment agent (dimethyl sulfoxide or 2-pyrrolidone). The cellulose filter paper was cut into strips of 5 cm (length)×3 cm (width). Impregnation of the cellulose filter paper with the solution was done by immersing the cellulose filter paper in the solution for 1 minute. After impregnation, the cellulose filter paper was sandwiched between Kimtowel$^{TM}$ (paper towel for laboratory use manufactured by Nippon Paper Crecia Co., Ltd.) to remove excess solution and dried by hot pressing at 180° C. for 1 minute.

Procedure 2: A 0.1% solution of the sublimable color material (C.I. Disperse Red 60, C.I. Disperse Blue 359, or C.I. Disperse Yellow 54) used for textile printing described later in tetrahydrofuran was spotted on the carrier and then dried to prepare a development sample. A capillary was used for spotting the solution. The volume of solution to be spotted was 1 μl. The diameter of the spot was about 2 mm. The solution was spotted at a position 1 cm from the bottom edge of the cellulose filter paper. After spotting, the sample was sufficiently dried with warm air.

Procedure 3: The development sample was developed using acetonitrile as a solvent for 3 minutes at 25° C. Specifically, the development sample was placed as upright as possible in a container for development including acetonitrile at a depth of about 5 mm, such that the portion where the solution had been spotted in Procedure 2 was not immersed in the acetonitrile. The container for development was covered with a lid and the development was done. The development time was three minutes after the cellulose filter paper started to be immersed in the acetonitrile.

Procedure 4: The Rf value was calculated by the following formula.

$$Rf = \frac{\text{(distance travelled by the sublimable color material)}}{\text{(distance travelled by acetonitrile)}}$$

The "distance travelled by the sublimable color material" was defined as the distance from the center of the portion where the solution had been spotted in Procedure 2 to the darkest position of the spot after the development. When it was difficult to determine the darkest position, it was defined as the distance from the center of the portion where the solution had been spotted in Procedure 2 to the middle of the leading edge and trailing edge of the spot after the development.

The "distance travelled by acetonitrile" was defined as the distance from the center of the portion where the solution had been spotted in Procedure 2 to the leading edge of the spot after the development.

An average of three measurements was taken as the Rf value for each color-material scavenging compound.

The Rf values for the fabric treatment agents 1 and 2 were measured using the cellulose filter paper itself as a carrier.

Preparation of Textile Printing Ink

After stiffing and mixing Disperbyk-190 (acid value: 10 mg KOH/g, manufactured by BYK Chemie Japan Co., Ltd.) as a dispersant and ion-exchanged water to obtain a uniform liquid, C.I. Disperse Red 60 was added as the sublimable color material (dispersible dye), premixed, and dispersed until the Z-average particle diameter measured by the dynamic light scattering method was in a range of 150 to 200 nm to prepare a dispersion liquid having a sublimable color material concentration of 20% by mass. At this time, the amounts of the dispersant, the ion-exchanged water, and the sublimable color material were adjusted such that the content of the sublimable color material was 20% by mass with respect to the total mass of the dispersion liquid, and the solid content of the dispersant was 30% by mass with respect to the total mass of the sublimable color material. Note that the measurement of Z-average particle diameter by the dynamic light scattering method was done using a sand grinder in which 0.5 mm zirconia beads were put in a volume ratio of 50% using a Zetasizer 1000 (manufactured by Malvern Instruments Ltd., "Zetasizer" is a registered trademark of the company).

30% by mass of the obtained dispersion liquid, 10% by mass of glycerin as an organic solvent, 25% by mass of ethylene glycol, an appropriate amount of PROXEL GXLO as a preservative, and an appropriate amount of Na citrate hydrate as a pH-adjuster were mixed, and ion-exchanged water was added thereto such that the total mass became 100% by mass, and then the mixture was filtered through a filter of 1 μm mesh to obtain a textile printing ink 1 (magenta sublimable ink) including 6% by mass of C.I. Disperse Red 60.

Textile printing ink 2 (blue sublimable ink) including 6% by mass of C.I. Disperse Blue 359 was prepared in the same manner as the preparation of the textile printing ink 1 (magenta sublimable ink), except that C.I. Disperse Red 60 was replaced by C.I. Disperse Blue 359.

Textile printing ink 3 (yellow sublimable ink) including 3% by mass of C.I. Disperse Yellow 54 was prepared in the same manner as the preparation of the textile printing ink 1 (magenta sublimable ink), except that C.I. Disperse Red 60 was replaced by C.I. Disperse Yellow 54 and that the mixing ratio of the dispersion liquid was changed from 30% mass to 15% by mass.

Textile Printing (1) Pretreatment of Fabric with Fabric Treatment Agent (Preparation of Pretreated Fabric)

Cotton broadcloth 40 (100% cotton) was used as the fabric. Each of the above prepared fabric treatment agents was applied to the fabric using an inkjet printer having an inkjet head (Konica Minolta head KM102 4iMAE) at 540 dpi (main scan)×720 dpi (sub scan). The area of application was 200 mm×200 mm, and the amount of application was 40 g/m$^2$. The pretreated fabric pretreated with each fabric treatment agent was thus obtained.

(2) Application of Textile Printing Ink to Transfer Sheet

A A4 sublimation transfer sheet with glue (manufactured by Systemgraphi Co., Ltd.) was used as a transfer sheet. The textile printing ink prepared above was applied to the transfer sheet using an inkjet printer having an inkjet head (Konica Minolta head KM1024 iMAE) at 540 dpi (main scan)×720 dpi (sub scan) to form a solid image (ink layer) of 200 mm×200 mm on the transfer sheet. The discharge frequency was set to 22.4 kHz. After that, the transfer sheet with textile printing ink was dried using a dryer at 70° C. for 30 seconds.

(3) Sublimation Transfer of Textile Printing Ink to Fabric

The solid image on the transfer sheet with textile printing ink was brought into contact with the pretreated fabric prepared as described above at an area to which the fabric treatment agent had been applied before drying. Then, using a transfer device (heat press machine), the heat press was done at 180° C. for 3 minutes with a pressing pressure of 300 g/cm$^2$. As a result, the textile printing ink on the transfer sheet was sublimely transferred onto the pretreated fabric to obtain a textile-printed fabric.

Evaluation of Effect of Reducing Discoloration and Fading

The L*, a*, and b* values in the L*a*b* color space were measured for each textile-printed fabrics printed with a respective fabric treatment agent using a spectrophotometer (CM-25d manufactured by Konica Minolta, Inc., with a light source of D65). Then, after leaving each textile-printed fabric in an environment of 20° C. and 95%RH for seven days, the L*, a*, and b* values were measured again. The differences ΔL*, Δa*, and Δb* in respective L*, a*, and b* values before and after leaving were determined. Then, the color difference (ΔE*ab) before and after leaving was calculated using the following formula.

$$\Delta E^*ab = \{(\Delta L^*)^2 + (\Delta a^*)^2 + (\Delta b^*)^2\}^{1/2} \quad \text{(Formula)}$$

Based on the color difference (ΔE*ab), the effect of reducing discoloration and fading was evaluated according to the following criteria. The evaluation results are shown in Table I.

A: ΔE*ab was less than 2.
B: ΔE*ab was 2 or more and less than 4.
C: ΔE*ab was 4 or more and less than 6.
D: ΔE*ab was 6 or more and less than 8.
E: ΔE*ab was 8 or more and less than 10.
F: ΔE*ab was 10 or more and less than 12.
G: ΔE*ab was 12 or more and less than 14.
H: ΔE*ab was 14 or more.

TABLE I

| Fabric Treatment Agent No. | Ingredient | | | | Evaluation | | |
|---|---|---|---|---|---|---|---|
| | Color-Material Scavenging Compound | | Solvent | | Ink for Textile Printing | | |
| | Type | Rf Value | Type | I/O Value | No. | Sublimable Color Material | Evaluation Result |
| 1  | —            | 0.93 | Dimethyl Sulfoxide | 1.75 | 1 | DR60  | H |
| 2  | —            | 0.82 | Dimethyl Sulfoxide | 1.75 | 2 | DY54  | F |
| 3  | Compound (3) | 0.79 | Dimethyl Sulfoxide | 1.75 | 1 | DR60  | F |
| 4  | Compound (3) | 0.66 | Dimethyl Sulfoxide | 1.75 | 2 | DY54  | G |
| 5  | Compound (7) | 0.64 | Dimethyl Sulfoxide | 1.75 | 1 | DR60  | E |
| 6  | Compound (7) | 0.53 | Dimethyl Sulfoxide | 1.75 | 2 | DY54  | D |
| 7  | Compound (7) | 0.28 | Dimethyl Sulfoxide | 1.75 | 3 | DB359 | B |
| 8  | Compound (10)| 0.53 | Dimethyl Sulfoxide | 1.75 | 1 | DR60  | C |
| 9  | Compound (10)| 0.44 | Dimethyl Sulfoxide | 1.75 | 2 | DY54  | B |
| 10 | Compound (10)| 0.23 | Dimethyl Sulfoxide | 1.75 | 3 | DB359 | A |
| 11 | Compound (11)| 0.36 | Dimethyl Sulfoxide | 1.75 | 1 | DR60  | B |
| 12 | Compound (11)| 0.30 | Dimethyl Sulfoxide | 1.75 | 2 | DY54  | B |
| 13 | Compound (11)| 0.16 | Dimethyl Sulfoxide | 1.75 | 3 | DB359 | A |
| 14 | Compound (13)| 0.17 | Dimethyl Sulfoxide | 1.75 | 1 | DR60  | A |
| 15 | Compound (13)| 0.14 | Dimethyl Sulfoxide | 1.75 | 2 | DY54  | A |
| 16 | Compound (13)| 0.07 | Dimethyl Sulfoxide | 1.75 | 3 | DB359 | A |
| 17 | Compound (10)| 0.53 | 2-Pyrrolidone      | 1.15 | 1 | DR60  | D |
| 18 | Compound (11)| 0.36 | 2-Pyrrolidone      | 1.15 | 1 | DR60  | C |

In the TABLE, "DR60" represents C.I. Disperse Red 60, "DB3 59" indicates C.I. Disperse Blue 359, and "DY54" indicates C.I. Disperse Yellow 54.

From the above results, it was confirmed that the fabric treatment agents 4 to 18 having the Rf values of 0.7 or less could have reduced the discoloration and fading of textile-printed fabrics compared to the fabric treatment agents 1 to 3.

Example 2

Preparation of Fabric Treatment Agent

Fabric treatment agents 1 to 18 were prepared by mixing the color-material scavenging compound and the solvent in the combinations listed in Table II such that the content of the color-material scavenging compound was 20% by mass.

The compounds used as the color-material scavenging compounds were Compounds (1) to (13) described above.

The Rf value for each of the respective color-material scavenging compounds in Table II was obtained by paper chromatography under the following procedures.

Procedures for Paper Chromatography Method

Procedure 1: A cellulose filter paper No. 5C according to JIS P 3801:1995 was impregnated with a 10% solution of the color-material scavenging compound, and then dried to prepare a carrier. The solvent used for the 10% solution of the color-material scavenging compound was a solvent of the same type as the solvent included in the fabric treatment agent (dimethyl sulfoxide or 2-pyrrolidone). The cellulose filter paper was cut into strips of 5 cm (length)×3 cm (width). Impregnation of the cellulose filter paper with the solution was done by immersing the cellulose filter paper in the solution for 1 minute. After impregnation, the cellulose filter paper was sandwiched between Kimtowel™ (paper towel for laboratory use) to remove excess solution and dried by hot pressing at 180° C. for 1 minute.

Procedure 2: A 0.1% solution of C.I. Disperse Red 60 in tetrahydrofuran was spotted on the carrier and then dried to prepare a development sample. A capillary was used for spotting the solution. The volume of the solution to be spotted was 1 μL. The diameter of the spot was about 2 mm. The solution was spotted at a position 1 cm from the bottom edge of the cellulose filter paper. After spotting, the sample was sufficiently dried with warm air.

Procedure 3: The development sample was developed using acetonitrile as a solvent for 3 minutes at 25° C. Specifically, the development sample was placed as upright as possible in a container for development including acetonitrile at a depth of about 5 mm, such that the portion where the solution had been spotted in Procedure 2 was not immersed in the acetonitrile. The container for development was covered with a lid and the development was done. The development time was three minutes after the cellulose filter paper started to be immersed in the acetonitrile.

Procedure 4: The Rf value was calculated by the following formula.

$$Rf = \frac{\text{(distance travelled by the } C.\,I.\text{ Disperse Red 60)}}{\text{(distance travelled by acetonitrile)}}$$

The "distance travelled by C.I. Disperse Red 60" was defined as the distance from the center of the portion where the solution had been spotted in Procedure 2 to the darkest position of the spot after the development. When it was difficult to determine the darkest position, it was defined as the distance from the center of the portion where the solution had been spotted in Procedure 2 to the middle of the leading edge and trailing edge of the spot after the development.

The "distance travelled by acetonitrile" was defined as the distance from the center of the portion where the solution had been spotted in Procedure 2 to the leading edge of the spot after the development.

An average of three measurements was taken as the Rf value for each color-material scavenging compound.

The Rf value for the fabric treatment agent 1 was measured using the cellulose filter paper itself as a carrier.

Preparation of Textile Printing Ink

After stirring and mixing Disperbyk-190 (acid value: 10 mg KOH/g, manufactured by BYK Chemie Japan Co., Ltd.) as a dispersant and ion-exchanged water to obtain a uniform liquid, C.I. Disperse Red 60 was added as the sublimable color material (dispersible dye), premixed, and dispersed until the Z-average particle diameter measured by the dynamic light scattering method was in a range of 150 to 200 nm to prepare a dispersion liquid having a sublimable color material concentration of 20% by mass. At this time, the content of the sublimable color material was made to become 20% by mass with respect to the total mass of the dispersion liquid, and the solid content of the dispersant was made to become 30% by mass with respect to the total mass of the sublimable color material by adjusting the amounts of the dispersant, the ion-exchanged water, and the sublimable color material. Note that the measurement of Z-average particle diameter by the dynamic light scattering method was done using a sand grinder in which 0.5 mm zirconia beads were put in a volume ratio of 50% using a Zetasizer 1000 (manufactured by Malvern Instruments Ltd., "Zetasizer" is a registered trademark of the company).

30% by mass of the obtained dispersion liquid, 10% by mass of glycerin as an organic solvent, 25% by mass of ethylene glycol, an appropriate amount of PROXEL GXLO as a preservative, and an appropriate amount of Na citrate hydrate as a pH-adjuster were mixed, and ion-exchanged water was added thereto such that the total mass became 100% by mass, and then the mixture was filtered through a filter of 1 μm mesh to obtain the textile printing ink 1 (magenta sublimable ink).

The textile printing ink 2 (blue sublimable ink) and textile printing ink 3 (yellow sublimable ink) used in Example 1 were used as the textile printing inks 2 and 3 in Example 2.

Textile Printing

Textile printing was performed in the same manner as the processes (1) to (3) and [Evaluation of Effect of Reducing Discoloration and Fading] in Example 1.

TABLE II

| Fabric Treatment Agent No. | Ingredient | | | | Evaluation | | |
|---|---|---|---|---|---|---|---|
| | Color-Material Scavenging Compound | | Solvent | | Ink for Textile Printing | | |
| | Type | Rf Value | Type | I/O Value | No. | Sublimable Color Material | Evaluation Result |
| 1 | — | 0.93 | Dimethyl Sulfoxide | 1.75 | 1 | DR60 | H |
| 2 | Compound (1) | 0.76 | Dimethyl Sulfoxide | 1.75 | 1 | DR60 | G |
| 3 | Compound (2) | 0.83 | Dimethyl Sulfoxide | 1.75 | 1 | DR60 | F |
| 4 | Compound (3) | 0.79 | Dimethyl Sulfoxide | 1.75 | 1 | DR60 | F |
| 5 | Compound (4) | 0.69 | Dimethyl Sulfoxide | 1.75 | 1 | DR60 | E |
| 6 | Compound (5) | 0.67 | Dimethyl Sulfoxide | 1.75 | 1 | DR60 | E |
| 7 | Compound (6) | 0.69 | Dimethyl Sulfoxide | 1.75 | 1 | DR60 | E |
| 8 | Compound (7) | 0.64 | Dimethyl Sulfoxide | 1.75 | 1 | DR60 | E |
| 9 | Compound (8) | 0.65 | Dimethyl Sulfoxide | 1.75 | 1 | DR60 | D |
| 10 | Compound (9) | 0.64 | Dimethyl Sulfoxide | 1.75 | 1 | DR60 | D |
| 11 | Compound (10) | 0.53 | Dimethyl Sulfoxide | 1.75 | 1 | DR60 | C |
| 12 | Compound (11) | 0.36 | Dimethyl Sulfoxide | 1.75 | 1 | DR60 | B |
| 13 | Compound (12) | 0.35 | Dimethyl Sulfoxide | 1.75 | 1 | DR60 | B |
| 14 | Compound (13) | 0.17 | Dimethyl Sulfoxide | 1.75 | 1 | DR60 | A |
| 15 | Compound (10) | 0.53 | 2-Pyrrolidone | 1.15 | 1 | DR60 | D |
| 16 | Compound (11) | 0.36 | 2-Pyrrolidone | 1.15 | 1 | DR60 | C |
| 17 | Compound (11) | 0.36 | Dimethyl Sulfoxide | 1.75 | 2 | DY54 | B |
| 18 | Compound (13) | 0.17 | Dimethyl Sulfoxide | 1.75 | 2 | DY54 | A |
| 19 | Compound (13) | 0.17 | Dimethyl Sulfoxide | 1.75 | 3 | DB359 | A |

In the TABLE, "DR60" represents C.I. Disperse Red 60, "DB3 59" indicates C.I. Disperse Blue 359, and "DY54" indicates C.I. Disperse Yellow 54.

From the above results, it can be confirmed that the fabric treatment agents 5 to 19 having the Rf values of 0.7 or less can reduce the discoloration and fading of textile-printed fabrics compared to the fabric treatment agents 1 to 4.

Example 3

Preparation of Fabric Treatment Agent

Fabric treatment agents (pretreatment agents 1 to 17) were prepared by mixing the solvent, aromatic heterocyclic compound, surfactant, and ion-exchanged water in the compositions shown in Table III below.

The compounds used as the aromatic heterocyclic compound were Example Compounds (a1), (a2), and (a10).

TABLE III

| | Pretreatment Agent | 1 | 2 | 3 | 4 | 5 | 6 | 7 | 8 | 9 | 10 |
|---|---|---|---|---|---|---|---|---|---|---|---|
| Solvent (I/O Value, Boiling Point [° C.]) | Propylene Glycol (3.3, 188° C.) | 80 | — | — | — | — | — | — | — | — | — |
| | Ethylene Glycol (5.0, 197° C.) | — | 80 | — | — | — | — | — | — | — | — |
| | Dimethyl Sulfoxide (1.75, 189° C.) | — | — | 80 | — | — | — | — | 4 | 98.9 | 89.9 |
| | 2,3-Butanediol (2.5, 177° C.) | — | — | — | 80 | — | — | — | — | — | — |
| | Polypropylene Glycol (3.3, None) | — | — | — | — | 80 | — | — | — | — | — |
| | 3-Methoxy-1-butanol (1.2, 158° C.) | — | — | — | — | — | 80 | 79.9 | — | — | — |
| Aromatic Heterocyclic Compound | Example Compound (a1) | — | — | — | — | — | — | 20 | 1 | 1 | 10 |
| | Example Compound (a2) | — | — | — | — | — | — | — | — | — | — |
| | Example Compound (a10) | — | — | — | — | — | — | — | — | — | — |
| Surfactant | Sodium Dodecyl Sulfate | 0.1 | 0.1 | 0.1 | 0.1 | 0.1 | 0.1 | 0.1 | 0.1 | 0.1 | 0.1 |
| | Deionized Water | 19.9 | 19.9 | 19.9 | 19.9 | 19.9 | 19.9 | — | 94.9 | — | — |
| | Total | 100 | 100 | 100 | 100 | 100 | 100 | 100 | 100 | 100 | 100 |

| | Pretreatment Agent | 11 | 12 | 13 | 14 | 15 | 16 | 17 |
|---|---|---|---|---|---|---|---|---|
| Solvent (I/O Value, Boiling Point [° C.]) | Propylene Glycol (3.3, 188° C.) | — | 29.9 | — | — | — | — | — |
| | Ethylene Glycol (5.0, 197° C.) | — | — | 29.9 | — | — | — | — |
| | Dimethyl Sulfoxide (1.75, 189° C.) | 79.9 | 50 | 50 | 50 | 65 | 79.9 | 79.9 |
| | 2,3-Butanediol (2.5, 177° C.) | — | — | — | 29.9 | — | — | — |
| | Polypropylene Glycol (3.3, None) | — | — | — | — | — | — | — |
| | 3-Methoxy-1-butanol (1.2, 158° C.) | — | — | — | — | — | — | — |
| Aromatic Heterocyclic Compound | Example Compound (a1) | 20 | 20 | 20 | 20 | 20 | — | — |
| | Example Compound (a2) | — | — | — | — | — | 20 | — |
| | Example Compound (a10) | — | — | — | — | — | — | 20 |
| Surfactant | Sodium Dodecyl Sulfate | 0.1 | 0.1 | 0.1 | 0.1 | 0.1 | 0.1 | 0.1 |
| | Deionized Water | — | — | — | — | 14.9 | — | — |
| | Total | 100 | 100 | 100 | 100 | 100 | 100 | 100 |

[Unit: % by mass]

Preparation of Ink

Preparation of Ink 1

Preparation of Dispersion Liquid

After stiffing and mixing Disperbyk-190 (acid value: 10 mg KOH/g, manufactured by BYK Chemie Japan Co., Ltd.) as a dispersant and ion-exchanged water to obtain a uniform liquid, C.I. Disperse Red 60 was added as the dispersible dye, premixed, and dispersed until the Z-average particle diameter measured by the dynamic light scattering method was in a range of 150 to 200 nm to prepare a dispersion liquid having a dispersible dye concentration of 20% by mass. At this time, the content of the dispersible dye was made to become 20% by mass with respect to the total mass of the dispersion liquid, and the solid content of the dispersant was made to become 30% by mass with respect to the total mass of the dispersible dye by adjusting the amounts of the dispersant, the ion-exchanged water, and the dispersible dye.

Note that the measurement of Z-average particle diameter by the dynamic light scattering method was done using a sand grinder in which 0.5 mm zirconia beads were put in a volume ratio of 50% using a Zetasizer 1000 (manufactured by Malvern Instruments Ltd., "Zetasizer" is a registered trademark of the company).

Preparation of Ink

30% by mass of the obtained dispersion liquid, 10% by mass of glycerin as a solvent, 25% by mass of ethylene glycol, an appropriate amount of PROXEL GXL0 as a preservative, and an appropriate amount of Na citrate hydrate as a pH-adjuster were mixed, and ion-exchanged water was added thereto such that the total mass became 100% by mass, and then the mixture was filtered through a filter of 1 μm mesh to obtain an ink 1 (magenta sublimable ink).

Image Forming

(1) Method of Pretreatment

Cotton broadcloth 40 (100% cotton) was used as the fabric. Then, the fabric was dipped into a tub filled with the pretreatment agent prepared above, and the excess pretreatment agent was squeezed out with a mangle roller at 80% pickup rate (amount of treatment solution applied with respect to the weight of the fabric). The temperature in the tub was set at 20 to 25° C.

(2) Application of Ink to Transfer Sheet

Next, an inkjet printer having an inkjet head (Konica Minolta head KM1024 iMAE) was prepared as an image forming apparatus. The ink 1 prepared above was ejected from nozzles of the inkjet head, and a solid image was formed on a A4 sublimation transfer sheet with glue (manufactured by Systemgraphi Co., Ltd.) as a transfer sheet.

Specifically, an image (200 mm×200 mm as a whole) including a fine line grid, a gradient area, and a solid area was formed at 540 dpi (main scan)×720 dpi (sub scan). The unit "dpi" represents the number of ink droplets (dots) per 2.54 cm. The discharge frequency was set to 22.4 kHz.

After that, the transfer sheet with the ink was dried using a dryer at 50 to 80° C. for 30 seconds.

(3) Transfer of Ink Onto Fabric

Next, the transfer sheet with ink (ink layer) was pressed while heating using a transfer device (heat press machine) at 200° C. for 50 seconds with a pressing pressure of 300 g/cm². As a result, the ink on the transfer sheet was transferred onto the pretreated fabric to obtain an image formed fabric.

Evaluation

The obtained image formed fabric was evaluated as follows.

Colorability

An image density was measured by a spectrophotometer (manufactured by Konica Minolta, Inc.) to calculate a K/S value. The K/S value is an index of surface color density defined by the following equation (Kubelka-Munk equation).

$$\frac{K}{S} = \frac{(1-R)^2}{2R}$$

(K: Absorption coefficient of light, S: Scattering coefficient of light, R: Surface reflectance).

The larger K/S value means that the color density is higher, and the smaller K/S value means that the color density is lower. The calculated K/S values were evaluated for the colorability according to the following criteria. In the following criteria, ranks 2 to 5 were evaluated as having no practical problems.

Criteria

5: The K/S value was 15 or more.
4: The K/S value was 12 or more and less than 15.
3: The K/S value was 10 or more and less than 12.
2: The K/S value was 8 or more and less than 12.
1: The K/S value was less than 8.

Bleed-Out

The colored image formed fabric was left in a high humidity environment (environment temperature: 20° C., humidity: 90% RH or higher) for one day, and the K/S value was calculated in the same way as for the colorability evaluation. The density reduction rate was calculated by comparing the K/S value at the time of coloring (evaluated immediately after coloring) with the color density after leaving in a high-humidity environment, and evaluated according to the following criteria. The density reduction rate was calculated as follows.

$$\frac{(K/S \text{ value at the time of coloring}) - (K/S \text{ value after leaving in a high-humidity environment})}{(K/S \text{ value at the time of coloring})}$$

In the following criteria, ranks 2 to 5 were evaluated as having no practical problems.

Criteria

5: The density reduction rate is less than 20%.
4: The density reduction rate is 20% or more and less than 25%.
3: The density reduction rate is 25% or more and less than 30%.
2: The density reduction rate is 30% or more and less than 50%.
1: The density reduction rate is 50% or more.

Texture

The texture of the obtained image formed fabric and the fabric was sensuously evaluated by touching it with a finger. Evaluation was made according to the following criteria.

Criteria

5: The original softness of the fabric was maintained and was almost unchanged (compared to the fabric before image formation).
4: The fabric was very slightly harder than before image formation, the texture of the fabric was not impaired, but there is no problem in practical use.
3: The fabric was very slightly harder than before imaging formation, and the texture was very slightly changed, but there was no problem in practical use.
2: The fabric was slightly harder than before image formation, and the texture was slightly changed, but there was no problem in practical use.
1: The fabric was harder than before image formation, and the texture of the fabric was markedly impaired, which caused a practical problem.

using a pretreatment agent with neither the aromatic heterocyclic compound nor the solvent having the I/O value of 1.5 or higher, and the image formed fabric No. 18 using a pretreatment agent without the solvent having the I/O value of 1.5 or higher.

What is claimed is:

1. A fabric treatment agent that is used in textile printing with a sublimable color material, comprising:
   a color-material scavenging compound having an Rf value of 0.7 or less according to paper chromatography performed under following conditions:
   Procedure 1: Cellulose filter paper is impregnated with a 10% solution of the color-material scavenging compound and then dried to prepare a carrier;
   Procedure 2: A 0.1% solution of a sublimable color material in tetrahydrofuran is spotted on the carrier and then dried to prepare a development sample;
   Procedure 3: The development sample is developed using acetonitrile as a solvent for 3 minutes at 25° C.; and
   Procedure 4: The Rf value is calculated by a following formula:

$$Rf = \frac{\text{(distance travelled by the sublimable color material)}}{\text{(distance travelled by acetonitrile)}}.$$

2. The fabric treatment agent according to claim 1, wherein the color-material scavenging compound has the Rf value of 0.5 or less.

3. The fabric treatment agent according to claim 1, further comprising a solvent having an I/O value of 1.5 or more, the I/O value being a ratio of an inorganic value of the solvent to an organic value of the solvent.

4. The fabric treatment agent according to claim 1, wherein the color-material scavenging compound has an aromatic ring.

TABLE IV

| Image-Formed Fabric No. | Pretreatment Agent | Solvent Condition | | | Evaluation | | |
|---|---|---|---|---|---|---|---|
| | | I/O Value | Boiling Point[° C.] | Aromatic Heterocyclic Compound | Colorability | Bleed-out | Texture |
| 1 | Pretreatment Agent 8 | 1.75 | 189 | Example Compound (a1) | 2 | 5 | 4 |
| 2 | Pretreatment Agent 9 | 1.75 | 189 | Example Compound (a1) | 4 | 2 | 5 |
| 3 | Pretreatment Agent 10 | 1.75 | 189 | Example Compound (a1) | 5 | 4 | 5 |
| 4 | Pretreatment Agent 13 | 5.0, 1.75 | 197, 189 | Example Compound (a1) | 4 | 4 | 5 |
| 5 | Pretreatment Agent 14 | 2.5, 1.75 | 177, 189 | Example Compound (a1) | 3 | 4 | 5 |
| 6 | Pretreatment Agent 12 | 3.3, 1.75 | 188, 189 | Example Compound (a1) | 4 | 4 | 5 |
| 7 | Pretreatment Agent 11 | 1.75 | 189 | Example Compound (a1) | 5 | 5 | 5 |
| 8 | Pretreatment Agent 15 | 1.75 | 189 | Example Compound (a1) | 5 | 5 | 5 |
| 9 | Pretreatment Agent 16 | 1.75 | 189 | Example Compound (a2) | 5 | 5 | 5 |
| 10 | Pretreatment Agent 17 | 1.75 | 189 | Example Compound (a10) | 5 | 5 | 5 |
| 11 | None | — | — | None | 1 | 1 | 5 |
| 12 | Pretreatment Agent 2 | 5.0 | 197 | None | 4 | 1 | 5 |
| 13 | Pretreatment Agent 4 | 2.5 | 177 | None | 3 | 1 | 5 |
| 14 | Pretreatment Agent 5 | 3.3 | — | None | 5 | 1 | 1 |
| 15 | Pretreatment Agent 1 | 3.3 | 188 | None | 4 | 1 | 5 |
| 16 | Pretreatment Agent 3 | 1.75 | 189 | None | 5 | 1 | 5 |
| 17 | Pretreatment Agent 6 | 1.2 | 158 | None | 1 | 5 | 5 |
| 18 | Pretreatment Agent 7 | 1.2 | 158 | Example Compound (a1) | 1 | 5 | 4 |

As shown in the above results, the image formed fabrics No. 1 to 10 formed with the pretreatment agent of the present invention are superior in coloring, the texture, and bleed-out reduction compared to the image formed fabric No. 11 without a pretreatment agent, the image formed fabrics No. 12 to 16 using a pretreatment agent without the aromatic heterocyclic compound, the image formed fabric No. 17

5. The fabric treatment agent according to claim 1, wherein the color-material scavenging compound has five or more aromatic rings.

6. The fabric treatment agent according to claim 1, wherein the color-material scavenging compound has a structure having two aromatic rings that are bonded to each other by a single bond.

7. A textile printing ink set comprising:
the fabric treatment agent according to claim 1; and
a textile printing ink that includes the sublimable color material.

8. A fabric treatment agent that is used in textile printing with a sublimable color material, comprising:
a color-material scavenging compound having an Rf value of 0.7 or less according to paper chromatography performed under following conditions:
Procedure 1: Cellulose filter paper is impregnated with a 10% solution of the color-material scavenging compound and then dried to prepare a carrier;
Procedure 2: A 0.1% solution of C.I. Disperse Red 60 in tetrahydrofuran is spotted on the carrier and then dried to prepare a development sample;
Procedure 3: The development sample is developed using acetonitrile as a solvent for 3 minutes at 25° C.; and
Procedure 4: The Rf value is calculated by a following formula:

$$Rf = \frac{\text{(distance travelled by the } C.I. \text{ Disperse Red 60)}}{\text{(distance travelled by acetonitrile)}}.$$

9. The fabric treatment agent according to claim 8, wherein the color-material scavenging compound has the Rf value of 0.5 or less.

10. The fabric treatment agent according to claim 8, further comprising a solvent having an I/O value of 1.5 or more, the I/O value being a ratio of an inorganic value of the solvent to an organic value of the solvent.

11. The fabric treatment agent according to claim 8, wherein the color-material scavenging compound has an aromatic ring.

12. The fabric treatment agent according to claim 8, wherein the color-material scavenging compound has a structure having two aromatic rings that are bonded to each other by a single bond.

13. A textile printing ink set comprising:
the fabric treatment agent according to claim 8; and
a textile printing ink that includes the sublimable color material.

14. A textile printing method comprising:
dyeing of a fabric with a sublimable color material in a presence of a color-material scavenging compound, the color-material scavenging compound having an Rf value of 0.7 or less according to paper chromatography performed under following conditions:
Procedure 1: Cellulose filter paper is impregnated with a 10% solution of the color-material scavenging compound and then dried to prepare a carrier;
Procedure 2: A 0.1% solution of a sublimable color material in tetrahydrofuran is spotted on the carrier and then dried to prepare a development sample;
Procedure 3: The development sample is developed using acetonitrile as a solvent for 3 minutes at 25° C.; and
Procedure 4: The Rf value is calculated by a following formula:

$$Rf = \frac{\text{(distance travelled by the sublimable color material)}}{\text{(distance travelled by acetonitrile)}}.$$

15. The textile printing method according to claim 14, wherein the fabric includes natural fibers or synthetic cellulose fibers.

16. The textile printing method according to claim 14, wherein the dyeing is done by a sublimation transfer method.

17. A textile-printed fabric comprising:
a color-material scavenging compound; and
a sublimable color material, wherein
the color-material scavenging compound has an Rf value of 0.7 or less according to paper chromatography performed under following conditions:
Procedure 1: Cellulose filter paper is impregnated with a 10% solution of the color-material scavenging compound and then dried to prepare a carrier;
Procedure 2: A 0.1% solution of a sublimable color material in tetrahydrofuran is spotted on the carrier and then dried to prepare a development sample;
Procedure 3: The development sample is developed using acetonitrile as a solvent for 3 minutes at 25° C.; and
Procedure 4: The Rf value is calculated by a following formula:

$$Rf = \frac{\text{(distance travelled by the sublimable color material)}}{\text{(distance travelled by acetonitrile)}}.$$

\* \* \* \* \*